United States Patent [19]

Birbara et al.

[11] Patent Number: 5,234,584

[45] Date of Patent: Aug. 10, 1993

[54] CATALYTIC OXIDATION OF AQUEOUS ORGANIC CONTAMINANTS

[75] Inventors: Philip J. Birbara, Windsor Locks; Joseph E. Genovese, East Granby, both of Conn.

[73] Assignee: United Technologies Corporation, Hartford, Conn.

[21] Appl. No.: 650,136

[22] Filed: Feb. 4, 1991

[51] Int. Cl.$^5$ .......................... B01D 35/18; C02F 1/02
[52] U.S. Cl. .................................... 210/181; 210/188; 210/205; 210/763; 210/903; 422/140; 422/146; 422/147; 422/203; 422/211; 422/212
[58] Field of Search ............... 422/140, 146, 147, 203, 422/211, 212; 210/758, 752, 762, 763, 761, 903, 766, 181, 188, 205

[56] References Cited

U.S. PATENT DOCUMENTS

| | | | |
|---|---|---|---|
| 2,665,249 | 1/1951 | Zimmermann | 210/2 |
| 3,133,016 | 5/1964 | Stine et al. | 210/3 |
| 4,683,065 | 7/1987 | Sheikh | 210/668 |
| 4,699,720 | 10/1987 | Harada et al. | 210/762 |
| 4,741,833 | 5/1988 | Sheikh | 210/665 |
| 4,859,435 | 8/1989 | Roberts et al. | 423/219 |

FOREIGN PATENT DOCUMENTS

| | | |
|---|---|---|
| 2444008 | 7/1980 | France . |
| PCT US 92 00969 | 6/1992 | PCT Int'l Appl. . |
| 1175148 | 12/1969 | United Kingdom . |

OTHER PUBLICATIONS

S. Goto and J. M. Smith; Trickle-Bed Reactor Performance-Part I Holdup and Mass Transfer Effects; Jul. 1975; vol. 21, No. 4 pp. 706-713.
S. Goto and J. M. Smith; Trickle-Bed Reactor Performance-Part II-Reaction Studies; Jul. 1975; vol. 21, No. 4 pp. 714-720.
L. Ross and A. Chowdhury; Catalytic Oxidation of Strong Waste Waters; Jul. 11-14, 1977.
C. Hodges and L. Roselaar; Gold and Platinum Catalysed Oxidation of Methanol; 1975; vol. 25, pp. 609-614.
J. Firth and H. Holland; Catalytic Oxidation of Methane Over Noble Metals; 1969; Jul 65, No. 4 pp. 1121-1127.
Yukio Takahashi and Haruhiko Ohya; Wet-Oxidation Waste Management System for Celss; Jul. 15-17, 1985.
F. Hackman; Toxic Organic Chemicals-Destruction and Waste Treatment; 1978; pp. 34-40.
Janez Level and J. M. Smith; Oxidation of Acetic Acid Solutions in a Trickle-Bed Reactor; Jan. 1976; vol. 22, No. 2 pp. 159-168.
Zeolite-Encapsulated Platinum Catalysts, by T. R. Felthouse et al., published in Journal of Catalysts, vol. 98, No. 2 (Apr. 1986) pp. 411-433.
Treatment of Industrial Waste Water Containing Organic Matter by Platinum-Catalyzed Oxygen Oxidation, Anaerobic Fermentation, and Optional Biological Oxidation, abstract of JP-A-52-055255, abstract number 77-42507Y, published in World Patents Index, week 7724.
Novel Procedures for the preparation of platinum and other metals in forms having abnormally High Catalytic Activity, by D. J. Booth et al, published in Chemistry and Industry, No. 17, Sep. 2.

*Primary Examiner*—Patrick P. Garvin
*Assistant Examiner*—Brent M. Peebles
*Attorney, Agent, or Firm*—George J. Romanik

[57] ABSTRACT

A catalyst for oxidizing aqueous organic contaminants includes about 5 wt % to about 20 wt % noble metal crystallites selected from the group consisting of platinum, palladium, ruthenium, iridium, and combinations thereof deposited on a high surface area catalyst support. The crystallites are about 100 Å or smaller. A system for catalytically oxidizing aqueous organic contaminants has a catalyst bed containing such a catalyst, means for heating a reactor feed stream to a desired reaction temperature, means oxygenating the feed stream, and a phase separator for separating gaseous reaction products from a reactor effluent stream.

10 Claims, 1 Drawing Sheet

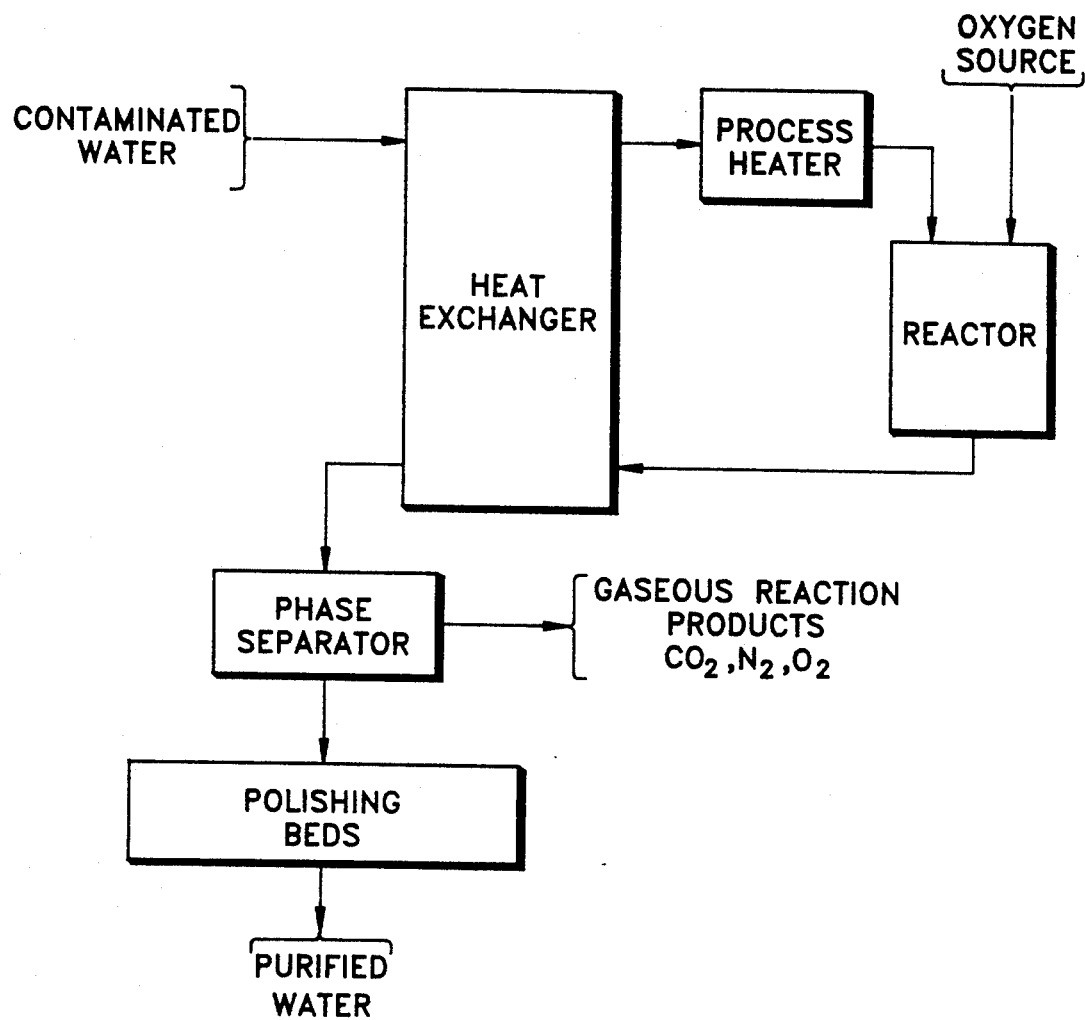

CATALYTIC OXIDATION OF AQUEOUS ORGANIC CONTAMINANTS

TECHNICAL FIELD

This invention relates to a method and system for removing low concentrations of organic contaminants from water streams.

BACKGROUND ART

Water may become contaminated with organic compounds in many ways. For example, ground water may be polluted by discharges from industrial processes or accidental spills. Water condensed from closed atmospheres, such as those found in spacecraft, is frequently contaminated with small amounts of organic compounds which have collected in the atmosphere. Regardless of the source of organic contamination, it is often desirable to completely remove the organics to make the water potable, especially in a closed environment like a spacecraft in which it is desirable to recycle all water.

$C_4$ and larger organic compounds are relatively easy to remove from water by conventional methods such as adsorption or ion exchange. These removal methods, however, tend to leave low concentrations of organic compounds, especially low molecular weight compounds, in the water. In this context, low molecular weight compounds means $C_3$ and smaller organic compounds, including compounds which contain nitrogen, sulfur, halogen, or other atoms in addition to carbon, hydrogen, and oxygen atoms. Low concentration means concentrations less than about 500 parts per million (ppm). Low concentrations of low molecular weight organic compounds are difficult to remove from water streams, particularly those compounds which do not ionize. In addition, such compounds are not readily adsorbed on physical sorbents like activated charcoals, zeolites, and other high surface area sorbents. Oxidative processes which can remove aqueous organic contaminants are known, but they have drawbacks which make them unsuitable for use in closed environments or situations in which portability of the decontamination system is desirable. The key requirements of a process suitable for use in closed environments or situations requiring portability include high reliability, simplicity, low weight, low system volume, low power consumption, and low expendables consumption. These requirements can also be expressed as a need for a short residence time, which will minimize system weight and volume, and low reaction temperature and pressure, which will minimize system weight and power consumption.

The classic process for oxidatively treating contaminated water, known as wet air oxidation, is described in U.S. Pat. No. 2,665,249 to Zimmermann and U.S. Pat. No. 3,133,016 to Stine et al. The Zimmermann process requires temperatures of at least 450° F. and the Stine process requires temperatures between 200° F. and 600° F. and elevated pressures. Although both processes are capable of reducing the total organic carbon (TOC) content of contaminated water, they are incapable of removing some low molecular weight organic compounds, especially acetic acid, from the water. Moreover, the processes are energy intensive and require reactors constructed from materials like titanium to withstand corrosive operating conditions.

Supercritical water oxidation is capable of converting aqueous organics, including acetic acid, to their elemental oxides. The process requires temperatures between 750° F. and 1200° F. and pressures between 3200 psig and 4000 psig. These high temperatures and pressures require vessels made with thick walls and costly alloys. As a result, the components of a supercritical water oxidation system are heavy and power consumption is high.

Photochemical processes which make use of light, such as ultraviolet or sunlight; a chemical oxidant, such as hydrogen peroxide or ozone; and sometimes a catalyst, such as titanium oxide, can also convert aqueous organics to their elemental oxides. However, these processes tend to have low conversions and require recycling to obtain complete oxidation of the organic contaminants. Reactor residence times of 30 minutes or more can be required. The large reactors required to achieve such residence times and the power demands imposed by the recycle make such processes impractical for use in closed environments or portable decontamination systems.

A catalytic oxidation process which uses a combination of absorptive beds and noble metal catalysts on activated alumina or similar supports to reduce the chemical oxidation demand (COD) of waste water is able, in some instances, to reduce the COD to zero. However, the process cannot routinely achieve a complete removal of COD. In the instances in which complete removal is possible, such results are only achievable with fresh catalyst. After only a few hours of operation, the process achieves a steady state effluent COD of several hundred milligrams per liter (mg/l).

Other catalytic oxidation studies with low molecular weight aqueous organic compounds have shown incomplete conversion at residence times of 3 to 5 minutes or more, even at reactor temperatures greater than 500° F. and pressures above 1000 psig.

Accordingly, it would be desirable to have a means for completely removing low concentrations of low molecular weight organic contaminants from water streams with a short residence time, a low reaction temperature, and a low reaction pressure.

DISCLOSURE OF THE INVENTION

The present invention is directed towards a method and system for completely removing low concentrations of low molecular weight organic contaminants from water streams with a short residence time, a low reaction temperature, and a low reaction pressure.

One aspect of the invention includes a catalyst for oxidizing aqueous organic contaminants. The catalyst includes about 5 wt % to about 20 wt % noble metal crystallites selected from the group consisting of platinum, palladium, ruthenium, iridium, and combinations thereof deposited on a high surface area catalyst support. The crystallites are about 100 Å or smaller.

Another aspect of the invention includes a system for catalytically oxidizing aqueous organic contaminants. The system has a catalyst bed containing a catalyst as described above, means for heating a reactor feed stream to a desired reaction temperature, means for oxygenating the reactor feed stream, and a phase separator for separating gaseous reaction products from a reactor effluent stream.

Another aspect of the invention includes a method of making a catalyst capable of oxidizing aqueous organic contaminants. A high surface area catalyst support is mixed with a noble metal halide salt solution while evaporating water from the salt solution at a controlled rate to distribute the noble metal halide salt on the catalyst support. The catalyst support containing the noble metal halide salt is heated in an oxygen-containing atmosphere to convert a significant portion of the noble metal halide to noble metal oxide. These steps are repeated at least one time to deposit a desired amount of noble metal on the charcoal granules. The noble metal oxide and any remaining noble metal halide are reduced to noble metal crystallites in a reducing atmosphere to produce a noble metal catalyst. The noble metal catalyst is washed to remove residual soluble halides.

Another aspect of the invention includes a method of removing organic contaminants from a water stream. A water stream containing organic contaminants is heated to a temperature sufficient to permit the complete oxidation of the organic contaminants and oxygenated. The contaminants in the water stream are contacted with a catalyst bed containing a catalyst as described above at a pressure sufficient to keep the water in the liquid phase within the reactor such that the organic contaminants in the water are completely oxidized. Gaseous reaction products and unreacted oxygen are separated from the water stream.

The foregoing and other features and advantages of the present invention will become more apparent from the following description and accompanying drawing.

BRIEF DESCRIPTION OF THE DRAWING

The FIGURE depicts the process flow of an aqueous organic contaminant removal system of the present invention.

BEST MODE FOR CARRYING OUT THE INVENTION

The present invention provides a means for completely removing low concentrations of low molecular weight organic contaminants from water streams by an oxidation process. Low concentrations means concentrations of about 500 ppm or lower. Low molecular weight contaminants means $C_3$ and smaller organic compounds, including compounds which contain nitrogen, sulfur, halogen, or other atoms in addition to carbon, hydrogen, and oxygen atoms. Complete removal means that the total organic contaminant concentration is less than about 1 ppm after treatment. This corresponds to a TOC of less than about 0.4 mg/l. The organic contaminants are oxidized to $H_2O$, $CO_2$, and other removable oxidation products. The oxidation of ammonia, amines, and amides produces $N_2$ in addition to $H_2O$ and $CO_2$, while the oxidation of sulfur containing compounds produces $SO_2$ and other removable products. The compounds which can be oxidized by the present invention include alcohols, organic acids, aldehydes, ketones, ethers, aliphatics, aromatics, amines, ammonia, amides, and other organic compounds, including nitrogen-, sulfur-, and halogen-containing organic compounds.

The catalyst of the present invention consists of an effective amount of noble metal crystallites deposited on a high surface area catalyst support. The noble metal crystallites may be platinum, palladium, ruthenium, iridium, or combinations thereof. Platinum is the preferred crystallite. While ruthenium, iridium, and palladium are less preferred for this application, they may have other favorable attributes in other systems. The catalyst should contain about 5 weight percent (wt %) to about 20 wt % noble metal crystallites. Preferably, the catalyst will contain about 10 wt % to about 15 wt % noble metal crystallites. The crystallites should be about 100 angstroms (Å) or smaller in size and should be uniformly distributed on the surface of the catalyst support.

The catalyst support may be any conventional high surface area catalyst support material which does not contribute to the organic load and is chemically and physically stable at the oxidizing conditions of the present invention. Ceramic support materials should have a surface area of at least about 50 $m^2/g$ and preferably will have a surface area of at least about 100 $m^2/g$. Activated carbon support materials should have a surface area of at least 500 $m^2/g$ and preferably will have a surface area of at least 1000 $m^2/g$. The support material should have an average size of about 4 mesh to about 40 mesh and may be in a granular form. Similarly sized support material in tabular, spherical, or extrudate forms are also suitable. Depending on the application, larger or smaller support material may also be suitable. Suitable ceramic support materials include alumina, magnesia, zirconia, silica, and mixtures thereof and are available from suppliers such as Aluminum Company of America (Pittsburgh, Pa.) and Harshaw-Filtrol (Cleveland, Ohio). Preferably, the catalyst support will be activated carbon granules having an average size of about 14 mesh to about 20 mesh, a surface area of about 1000 $m^2/g$ or greater, a nominal density of at least about 27 pounds per cubic foot ($lb/ft^3$), and an Iodine Number of about 1000 mg/g or greater. Coconut shell charcoal has been found to be a suitable source of activated carbon granules. Such granules are available as Type 416 or Type AC catalyst support material from Barneby & Sutcliffe Corp. (Columbus, Ohio).

The catalyst of the present invention may be fabricated by a procedure which has several steps, including a material preparation step, a noble metal halide deposition step, a reduction step to form noble metal crystallites, and a residual halide removal step.

First, the catalyst support material and a suitable noble metal halide salt solution are prepared. As-received support material should be screened to provide supports of an acceptable size and washed with water to remove dust and soluble impurities. The noble metal halide salt solution may be any aqueous solution of a platinum, palladium, ruthenium, or iridium halide salt containing enough noble metal to deposit a desired amount of the noble metal on the support material in one or more deposition steps. Aqueous solutions of chloro-platinic acid, ruthenium trichloride, and iridium tetrachloride are commonly used and are available from suppliers such as Mathey-Bishop (Philadelphia, Pa.) and Engelhard Corporation (Iselin, N.J.).

Next, the noble metal halide salt solution is thoroughly mixed with the support material and water is evaporated from the solution to deposit the noble metal halide on the support material. The amount of salt solution used and the rate and type of mixing should be adequate to uniformly distribute the noble metal halide over all of the support material. Mixing involving a gentle tumbling action has been found to be effective. While the salt solution and support material are mixed, water in the solution is evaporated at a controlled rate, that is, the water is evaporated at a rate which permits the mixing step to last long enough to adequately distribute the noble metal halide on the support material. Evaporation may be by heat, vacuum, or a combination thereof. The mixing and evaporation should proceed until the support material tumbles freely, indicating that most of the water has been removed. A rotating vacuum-type evaporator, such as a Model RE121 available from the Brinkman Instrument Company (Westbury, N.Y.), may be used to facilitate this step. The support material should then be heated in an oxygen-containing atmosphere to convert a significant portion of the noble metal halide on the support material to a noble metal oxide. Preferably, the conversion to a noble metal oxide will occur at about 200° C. to about 300° C. in a humidified atmosphere. A significant portion means at least 75%, and preferably at least 90%, of the noble metal halide is converted to a noble metal oxide. This may take about 30 minutes to about 60 minutes. Converting the noble metal halide to a noble metal oxide prevents the noble metal species on the support from dissolving and redistributing during subsequent deposition steps. After cooling the support material, the deposition step may be repeated several times to deposit additional noble metal. About 1 wt % to about 5 wt % noble metal should be deposited on the catalyst support during each deposition step. Preferably, about 2 wt % to about 3 wt % noble metal will be deposited during each step.

After the desired amount of noble metal has been deposited onto the support material, the noble metal oxide and any remaining noble metal halide are reduced to noble metal crystallites. The support material should be placed in an oven and an inert gas, such as nitrogen, should be flowed through the oven to displace air. While maintaining the inert gas flow, a reducing gas, such as hydrogen, should be introduced into the oven and the oven's temperature raised gradually to a temperature sufficient to reduce the noble metal species to crystallites. Preferably, the reduction will take place at about 250° C. to about 325° C. in a humidified atmosphere. The reducing gas flow rate should be sufficient to completely reduce the noble metal species to crystallites. The reducing gas should make up about 80 volume percent (vol %) to about 90 vol % of the gas flowing though the oven. After a reduction time of about 30 minutes to about 60 minutes, the oven should be cooled to about room temperature while the flow of inert and reducing gases is maintained.

Before use, the catalyst prepared according to this procedure should be screened to remove any material which is too fine, washed with water at about 65° C. to about 85° C. to remove residual halides, and dried.

Once fabricated, the catalyst may be loaded into a packed bed reactor of any conventional design which provides a reasonable pressure drop and good flow distribution through the bed. A reasonable pressure drop tends to decrease power requirements, while good flow distribution ensures contact between the organic contaminants and the catalyst. A packing void fraction of about 33% to about 40% has been found to provide a reasonable pressure drop with a granular catalyst. Preferably, the packing void fraction will be about 35% with a granular catalyst. The size of the catalyst bed, as measured by liquid residence time, depends on the particular contaminants in the water stream and the temperature at which the removal takes place. A catalyst bed with a liquid residence time of about 3 minutes to about 5 minutes is capable of oxidizing most contaminants. Residence times as low at about 1 minute may be sufficient to oxidize quick reacting compounds such as phenol, especially at temperatures higher than 250° F. Residence times of greater than 5 minutes might be required to oxidize some refractory compounds and might be desirable if catalyst bed volume is not a limiting design factor. In volume limited systems which have a platinum on activated carbon catalyst, the preferred liquid residence time is about 3 minutes to about 4 minutes. The reactor should be constructed of materials which are compatible with an acid an oxygen-containing environment and which can withstand temperatures of up to about 350° F. and pressures of up to about 125 psig. The reactor may include means for oxygenating the contaminated water with an oxygen source such as oxygen or hydrogen peroxide.

After the catalyst is packed into the reactor, it should be conditioned to remove any inorganic and organic contaminants which might impair its reactivity. One way to condition the bed is to flush it with a low concentration hydrogen peroxide solution, for example a 0.2 wt % hydrogen peroxide solution, at about 250° F. and about 50 psig. The elevated temperature initiates and accelerates catalyst conditioning. Conditioning is complete when an ion chromatographic analysis of the reactor effluent shows halide concentrations of less than about 1 ppm.

The reactor may be integrated into a system containing all the equipment necessary to fully treat the contaminated water. At a minimum, such a system should include means for heating the contaminated water to the desired reaction temperature, means for oxygenating the reactor feed stream, a reactor, and means for separating gaseous reaction products from the purified water.

The means for heating the contaminated water may include a process heater of conventional design, such as an electric heater. Preferably, the means for heating the contaminated water will also include a heat exchanger for exchanging heat between the reactor feed stream and the reactor effluent stream. The heat exchanger may be of any conventional design, such as a shell and tube, double pipe, or plate-type heat exchanger.

The means for oxygenating the reactor feed stream may be any conventional means for finely dispersing an oxygen source in a liquid stream. If the oxygen source is hydrogen peroxide or a similar liquid, no special equipment is needed to provide a fine dispersion because hydrogen peroxide spontaneously decomposes into small, well distributed oxygen bubbles on contact with the catalyst. If the oxygen source is gaseous $O_2$ or another gas, a flow distributor is needed to provide finely dispersed oxygen. The flow distributor may be of any conventional design. For example, the flow distributor may incorporate a porous metal plug which has a high pressure drop and is capable of finely dispersing a gas. Such plugs are available from Mott Metallurgical Corp. (Farmington, Conn.). The oxygenating means may be located at any convenient point in the system which permits the oxygen source to be finely dispersed in the reactor feed stream.

The means for separating gaseous reaction products from the purified water may be any conventional means for effecting a gas/liquid separation. For example, the separation means may be a cyclone or a knock-out drum. If the system is to be used in a zero gravity environment the separation means must be capable of making a zero gravity separation. Suitable zero gravity separators include rotating drums and hydrophobic or hydrophylic membrane materials. For example, a zero gravity separator may include a tube made from a Gore-Tex ® (W. L. Gore & Associates, Inc., Newark, Del.)

or similar hydrophobic membrane material having a bubble point greater than the system pressure. Pores in the membrane permit gaseous reaction products to flow through the tube walls, while the hydrophobic nature of the membrane prevents water from flowing through the pores. A preferred zero gravity separator consists of a hydrophobic membrane sheet positioned parallel to a hydrophylic membrane sheet on a frame. All gas entering the separator flows through the hydrophobic membrane, while all liquid entering the separator flows through the hydrophylic membrane. The hydrophobic membrane should be a material, such as a Gore-Tex® membrane, which has a bubble point greater than the system pressure, while the hydrophylic membrane should be a conventional hydrophylic membrane such as Supor 450, available from Gelman Sciences, Inc. (Ann Arbor, Mich.).

The system may also include polishing beds to remove contaminants remaining in the water after the separation. Contaminants remaining in the water might include large refractory organic contaminants which are not oxidized and dissolved reaction products such as acid gases, for example $NO_2$, $SO_2$, $CO_2$, and HCl, and ionic organic compounds, for example acetate ions. The polishing beds may contain conventional anionic and cationic ion exchange resins and physical-type sorbents such as activated carbon. In addition to removing any contaminants remaining in the water, the polishing beds can add biostats such as iodine or chlorine to the water to complete the purification process.

The FIGURE shows the process flow of a preferred system of the present invention. The system shown is intended to be exemplary and not limiting. Contaminated water is heated against the reactor effluent stream in a feed/effluent heat exchanger and further heated in a process heater. The contaminated water should be heated to a temperature sufficient to permit the complete oxidation of organic contaminants. If the reactor contains the preferred platinum on carbon catalyst of the present invention, temperatures of about 250° F. are required to ensure the oxidation of acetic acid, one of the most refractory of the light organic compounds. Other catalysts may require higher temperatures to oxidize acetic acid. If the water stream does not contain acetic acid or any of its precursors or if acetic acid is to be removed in a polishing bed, lower temperatures would be sufficient to oxidize other low molecular weight organic compounds. Because 250° F. is also a standard sterilization temperature, heating the contaminated water to at least 250° F. not only ensures complete oxidation of organic contaminants, it sterilizes any bacterial contaminants. Therefore, heating the contaminated water to at least about 250° F. is preferred.

After being heated, the contaminated water is oxygenated with an oxygen source such that the oxygen source is finely dispersed in the water. The oxygen source may be any chemical compound or mixture capable of providing oxygen for the oxidation reaction. For example, the oxygen source may be compressed oxygen or air, oxygen generated by water electrolysis, hydrogen peroxide, ozone, or any other convenient compound. A liquid, such as hydrogen peroxide, may be a convenient oxygen source because its rate of addition is easy to control. Oxygen generated by water electrolysis may be most convenient in a closed environment because it eliminates the need to store a consumable oxygen source. The oxygen source should be added in an amount sufficient to provide at least a stoichiometric amount of oxygen relative to the contaminants to be oxidized. Preferably, enough of the oxygen source should be mixed with the contaminated water to provide about 10% to about 20% excess oxygen, although more oxygen may be appropriate to oxidize especially refractory contaminants or if oxygen source consumption is not a design limitation.

After being oxygenated, the contaminated water is contacted with a catalyst bed containing the catalyst of the present invention at a pressure sufficient to keep the water in the liquid phase within the reactor. Keeping the water in the liquid phase helps minimize the reactor volume and maintains a good flow distribution though the catalyst bed. The catalyst promotes the complete oxidation of oxidizable compounds to produce reaction products plus purified water. The reaction products can include $H_2O$, $CO_2$, $N_2$, $SO_2$, HCl, and other compounds, depending on the contaminants present in the water. The $CO_2$ and $N_2$ are generally in the gas phase, although some of the $CO_2$ may dissolve in the water to form carbonate ions. The $SO_2$ is dissolved in the water. Because the oxidation is complete, there is no need to recycle any of the reactor effluent to the reactor feed.

After contacting the catalyst bed, the purified water stream is cooled against the contaminated water being fed to the reactor. Gaseous reaction products such as carbon dioxide and nitrogen and any unreacted oxygen are then separated from the water in the phase separator and the purified water is passed through a series of polishing beds to remove any contaminants remaining in the water.

The catalyst of the present invention is capable of oxidizing a wide variety of organic compounds and compounds containing nitrogen, sulfur, and halogens. For example, the catalyst of the present invention has been used to oxidize compounds such as methyl alcohol, ethyl alcohol, isopropyl alcohol, benzyl alcohol, phenol, ethyl ether, formic acid, acetic acid, benzoic acid, propionic acid, lactic acid, acetone, acetaldehyde, formamide, thiourea, ammonia, urea, and trichloroethylene. In general, the catalyst will oxidize any oxidizable organic compound as long as sufficient oxygen is available for the reaction, a sufficient residence time is provided, and the reactants are at an appropriate temperature.

Studies of the oxidation mechanism indicate that most organics are oxidized in a sequential manner. For example, alcohols are oxidized to organic acids, which in turn are oxidized to $CO_2$ and $H_2O$. Similarly, aldehydes and ketones form organic acids before complete oxidation to carbon dioxide and water. The oxidation of oxygenated organics such as sugars, starches, alcohols, ketones, aldehydes, and acids is facilitated by the presence of oxygen in the molecule.

The catalyst of the present invention oxidizes nitrogen-containing compounds, such as ammonia, amines, and amides, to nitrogen without the formation of nitrogen oxides. This phenomenon is primarily attributable to the relatively low temperatures at which these compounds oxidize in the presence of the catalyst. The production of $N_2$ rather than nitrogen oxides is desirable because the oxidation reaction consumes less oxidant and there is no need for ion exchange resins to remove nitrogen oxides. Moreover, in closed environmental systems, the production of $N_2$ avoids problems which the accidental release of $N_2O$ (laughing gas), NO (a toxic gas), and $NO_2$ (also a toxic gas) could create.

EXAMPLE 1

Slightly more than 100 g of 14–20 mesh Type AC activated charcoal granules (Barneby & Sutcliffe Corp., Columbus, Ohio) were washed with 1000 ml of distilled water. Free liquid water and entrained dust were removed by decanting. 1000 ml of distilled water was thoroughly mixed with the washed granules and the mixture was heated to near boiling for 15 minutes. The wash liquor was decanted and the wet granules were dried in an oven at 150° C. 14 ml of a 0.1 g Pt/ml solution of chloroplatinic acid (Engelhard Corporation, Iselin, N.J.) were diluted with distilled water to provide 300 ml of a 0.005 g Pt/ml chloroplatinic acid solution. 100 ml of the 0.005 g Pt/ml chloroplatinic acid solution were mixed with 100 grams of the washed charcoal granules in a 2000 ml round bottom boiling flask to deposit platinum chloride salt on the granules. The flask was attached to a Model RE121 rotating vacuum type evaporator (Brinkman Instrument Company, Westbury, N.Y.), adjusted to an angle of 30° from horizontal, placed in a 90° C. water bath, subjected to a vacuum of about 100 mmHg, and rotated at 30 rpm until the dried granules tumbled freely over each other. The dried granules were placed in a Pyrex TM glass container and heated in a humidified, air purged oven to 225° C. for 30 minutes to convert a significant portion of the platinum chloride to platinum oxide. After cooling, the deposition procedure was repeated two more times using the remaining 200 ml of chloroplatinic acid solution. After three salt deposition steps, the charcoal granules were loaded into a 36 inch long, 2 inch inside diameter Vycor tube and held in place with a glass fritted disc positioned about 12 inches from the open end of the tube. The tube was placed in a furnace and heated to 50° C. Nitrogen was flowed over the charcoal granules for a few minutes to displace air. While the furnace was heated to 325° C., humidified hydrogen was flowed over the granules at a rate of 2000 ml/min to reduce the platinum oxide and any remaining platinum chloride to disk shaped platinum metal crystallites. A small nitrogen purge flow was maintained so that the gas flowing over the granules was about 90 vol % hydrogen and about 10 vol % nitrogen. The reduction of the platinum species to metal crystallites was rapid, as noted by the condensation of water vapor from the cooled gaseous effluent. After a reduction time of 45 minutes, the tube was removed from the furnace and the catalyst was allowed to cool to near room temperature while the hydrogen and nitrogen flows were maintained. The catalyst was screened to remove granules smaller than 20 mesh and gently mixed with 1000 ml of distilled water to remove any dust clinging to the catalyst granules. After the wash water was decanted, another 1000 ml of distilled water was mixed with the catalyst and the mixture was heated to between 65° C. and 85° C. for 1 hour. The water was decanted and the heated wash step was repeated to reduce the catalyst's chloride content. After the third washing, the granules were placed in a Pyrex TM dish and dried in an oven at 125° C. for about one hour. The resulting catalyst contained 12 wt % platinum.

EXAMPLE 2

An aqueous solution containing 250 ppm acetic acid (TOC=100 mg/l) and 0.07 wt % hydrogen peroxide was prepared and passed through a reactor containing a catalyst prepared according to Example 1 at a rate of 30 cc/min. The reactor was sized to provide a residence time of about 3 minutes. The acetic acid was completely oxidized to $H_2O$ and $CO_2$ at the reaction conditions of 250° F. and 50 psig.

EXAMPLE 3

An aqueous solution containing 182 mg/l methyl alcohol, 103 mg/l ethyl alcohol, 15 mg/l acetone, 13 mg/l isopropyl alcohol, 5 mg/l benzyl alcohol, and 2 mg/l ethyl ether was prepared to provide a contaminated water stream with a TOC of 144.3 mg/l. The contaminated water stream was mixed with enough hydrogen peroxide to provide a hydrogen peroxide concentration of 0.12 wt % in the reactor feed and passed through a reactor containing a catalyst prepared according to Example 1 at a rate of 30 cc/min. This amount of hydrogen peroxide provided about 10% excess oxygen. The reactor was sized to provide a residence time of about 3 minutes. The organics in the water were completely oxidized to $H_2O$ and $CO_2$ at the reaction conditions of 250° F. and 50 psig. No loss in catalytic activity was detected after continuous operation of slightly more than 100 hours.

EXAMPLE 4

An aqueous solution containing 390 ppm formamide ($HCONH_2$) (TOC=104 mg/l) was prepared and mixed with stoichiometric quantities of $O_2$. The mixture was passed through a reactor containing a catalyst prepared according to Example 1 at a rate of 30 cc/min. The reactor was sized to provide a resident time of about 3 minutes. The formamide was completely oxidized to $H_2O$, $CO_2$, and $N_2$ at the reaction conditions of 250° F. and 50 psig. Mass and infrared spectroscopy revealed no $N_2O$, NO or $NO_2$ in the gas phase. Ion chromatographic analysis detected no nitrogen-containing specie such as ammonium, nitrate, or nitrite ions in the water. Cyanide and cyanate concentrations were less than the lowest detectable analysis limit of 0.01 ppm. No loss in catalytic activity was measured after processing more than 400 bed volumes of the formamide solution. Similar results were obtained by feeding an aqueous ammonia solution to the reactor under similar conditions.

EXAMPLE 5

An aqueous solution containing 450 ppm thiourea ($H_2NCSNH_2$) (TOC=71 mg/l) was prepared, mixed with stoichiometric quantities of hydrogen peroxide, and passed through a reactor containing a catalyst prepared according to Example 1 at a rate of 30 cc/min. The reactor was sized to provide a residence time of about 3 minutes. The thiourea was completely oxidized to $H_2O$, $CO_2$, $N_2$, and $SO_2$ at the reaction conditions of 250° F. and 50 psig. The $SO_2$ dissolved in the water to form sulfate ions, resulting in a reactor effluent pH of about 3. The presence of sulfate ions was confirmed by ion chromatographic analysis. Neither mass nor infrared spectroscopy detected $N_2O$, NO, or $NO_2$ in the gas phase. Ion chromatography detected no ammonium, nitrate, nitrite, or cyanide ions in the water. No loss of catalytic activity was observed after oxidizing more than 300 bed volumes of the thiourea solution.

The present invention provides a convenient means for removing low concentrations of aqueous organic contaminants which are not practically removed by sorbents and other means. It also provides several advantages over prior art oxidation processes.

First, because the present invention completely oxidizes the organic contaminants, including acetic acid, at temperatures of about 300° F. or lower and pressures of about 50 psig or lower, it consumes much less energy than prior art processes. Prior art processes are incapable of oxidizing compounds such as acetic acid at these conditions.

Second, because the present invention only requires a residence time of 5 minutes or less to oxidize refractory compounds such as acetic acid, the reactor can be much smaller than those required by prior art processes. As a result, the system of the present invention is appropriate for use in closed environments and in situations in which portability is required.

Third, because the contaminants are completely oxidized in a single pass with stoichiometric quantities of oxygen, there is no need for a recycle as in some prior art processes. The elimination of the need to recycle further reduces bed volume and energy requirements.

It should be understood that the invention is not limited to the particular embodiment shown and described herein, but that various changes and modifications may be made without departing from the spirit or scope of the claimed invention.

We claim:

1. A system for catalytically oxidizing aqueous organic contaminants, comprising:
   (a) means for heating a reactor feed stream containing aqueous organic contaminants to a desired reaction temperature;
   (b) means for oxygenating the reactor feed stream;
   (c) a catalyst bed capable of completely oxidizing the aqueous organic contaminants in the reactor feed stream at temperatures of about 300° F. or lower and a pressure sufficient to keep the reactor feed stream in the liquid phase to produce a substantially contaminant-free reactor effluent stream, wherein the catalyst bed includes a catalyst having about 5 wt % to about 20 wt % noble metal crystallites about 100 Å or smaller in size selected from the group consisting of platinum, palladium, ruthenium, iridium, and combinations thereof deposited on a high surface area catalyst support and the catalyst bed is sized to provide a liquid residence time of less than about 5 minutes, resulting in reduced system volume, weight, and energy consumption:
   (d) means for contacting the reactor feed stream with the catalyst bed; and
   (e) a phase separator for separating gaseous reaction products from the reactor effluent stream.

2. The system of claim 1, wherein the catalyst comprises about 10 wt % to about 15 wt % platinum crystallites.

3. The system of claim wherein the catalyst support is selected from the group consisting of alumina, magnesia, zirconia, silica, and mixtures thereof and has a surface area of at least about 50 m$^2$/g.

4. The system of claim 1 wherein the catalyst support is activated carbon having a surface area of at least about 500 m$^2$/g and a nominal density of at least about 27 lb/ft$^3$.

5. The system of claim 1 wherein the catalyst bed is sized to provide a liquid residence time of about 3 minutes to about 4 minutes.

6. The system of claim 1 wherein the phase separator is capable of separating gaseous reaction products from the reactor effluent stream in a zero gravity environment.

7. A system for catalytically oxidizing aqueous organic contaminants, comprising:
   (a) means for heating a reactor feed stream containing aqueous organic contaminants to a desired reaction temperature;
   (b) means for oxygenating the reactor feed stream;
   (c) a catalyst bed capable of completely oxidizing the aqueous organic contaminants in the reactor feed stream at temperatures of about 300° F. or lower and a pressure sufficient to keep the reactor feed steam in the liquid phase to produce a substantially contaminant-free reactor effluent stream, wherein the catalyst bed includes a catalyst having about 10 wt % to about 15 wt % platinum crystallites about 100 Å or smaller in size deposited on activated carbon granules that comprise coconut shell charcoal and have a surface area of at least about 500 m$^2$/g and a nominal density of at least about 27 lb/ft$^3$;
   (d) means for contacting the reactor feed stream with the catalyst bed; and
   (e) a phase separator for separating gaseous reaction products from the reactor effluent stream.

8. The system of claim 7 wherein the activated carbon granules have an average size of about 4 mesh to about 40 mesh.

9. The system of claim 7 wherein the phase separator is capable of separating gaseous reaction products from the reactor effluent stream in a zero gravity environment.

10. The system of claim 7 wherein the activated carbon granules have a surface area of at least about 1000 m$^2$/g.

* * * * *